United States Patent
Zulawski (10) Patent No.: US 7,037,226 B2
(45) Date of Patent: May 2, 2006

(54) DUAL CAM SURFACE CLUTCH

(75) Inventor: Dennis Zulawski, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/947,733

(22) Filed: Sep. 23, 2004

(65) Prior Publication Data

US 2005/0043128 A1   Feb. 24, 2005

Related U.S. Application Data

(63) Continuation of application No. 10/262,759, filed on Oct. 1, 2002, now abandoned.

(51) Int. Cl.
*F16H 59/00* (2006.01)

(52) U.S. Cl. ...................................................... 474/19

(58) Field of Classification Search ............. 474/8–12, 474/17–18, 19–21, 28–29, 43–46, 93; 415/98, 415/180
See application file for complete search history.

(56) References Cited

U.S. PATENT DOCUMENTS

| | | | |
|---|---|---|---|
| 2,205,975 A | 6/1940 | Heyer | |
| 3,224,287 A | 12/1965 | Gesche et al. | |
| 3,861,228 A | 1/1975 | Adams | |
| 4,378,221 A | 3/1983 | Huff et al. | |
| 4,493,677 A | 1/1985 | Ikenoya | |
| 4,585,429 A * | 4/1986 | Marier | 474/19 |
| 5,967,286 A | 10/1999 | Hokanson et al. | |
| 6,032,754 A | 3/2000 | Izumi et al. | |
| 6,095,937 A | 8/2000 | Aaen | |
| 6,120,399 A * | 9/2000 | Okeson et al. | 474/12 |
| 6,146,295 A | 11/2000 | Mor et al. | |
| 6,379,274 B1 | 4/2002 | Robert | |
| 6,569,043 B1 | 5/2003 | Younggren et al. | |
| 6,743,129 B1 * | 6/2004 | Younggren et al. | 474/19 |

FOREIGN PATENT DOCUMENTS

| | | | | |
|---|---|---|---|---|
| JP | 59-54856 | 3/1984 | | |
| JP | 05-87202 | 4/1993 | | |
| JP | 06-2748 | 1/1994 | | |
| JP | 2002-227949 | 8/2002 | | |
| WO | WO 87/0933 A1 * | 12/1987 | | 474/19 |

* cited by examiner

*Primary Examiner*—Marcus Charles
(74) *Attorney, Agent, or Firm*—Black Lowe & Graham; Darren J. Jones (57) ABSTRACT

A belt-driven clutch system having a driven clutch with a particular arrangement of cam followers and cam slots. One embodiment of the invention is a clutch having a fixed sheave, a movable sheave and a housing mounted to the movable sheave. The housing has a cam slot with first and second cam surfaces. The clutch also includes a pair of cam followers that is secured to the fixed sheave for acting upon the cam surfaces of the cam slot. A first cam follower of the pair of cam followers acts upon a first cam surface of the cam slot and a second cam follower of the pair of cam followers acts upon the second cam surface of the cam slot to reduce backlash. The invention also provides adjustment of spring tension and belt width of the clutch without requiring removal or disassembly of the clutch.

24 Claims, 9 Drawing Sheets

DUAL CAM SURFACE CLUTCH

FIELD OF THE INVENTION

This invention relates to belt-driven clutch systems, and more particularly to a driven clutch in a continuously variable transmission.

BACKGROUND OF THE INVENTION

Vehicles use a wide variety of transmissions for vehicle propulsion. A type of transmission that is often used in smaller vehicles, e.g., snowmobiles, go-karts, and all terrain vehicles (ATV), is an endless belt transmission, often referred to a continuously variable transmission (CVT). In a CVT, both outward torque and speed varies substantially continuously, i.e., without gearshifts, over the entire speed range of the engine. A CVT typically includes a driving clutch having a shaft that is coaxial with the output shaft of the vehicles engine. The driving or primary clutch includes a fixed sheave and a movable sheave that together define a pulley around which a drive belt travels. The drive belt also engages a driven or secondary clutch that transfers the engine's clutch power to a secondary shaft. The driven clutch also includes a fixed sheave and a movable sheave that together define a pulley.

The effective radius of both the primary and the secondary pulley may be variable. The ratio of the primary pulley radius to the secondary pulley radius determines the ratio of engine rotational speed to the secondary shaft rate of rotation. When the primary clutch radius is smaller than the secondary clutch radius, the secondary shaft will turn at a rate that is slower that the engine speed, resulting in a relatively low vehicle speed. As the ratio of the primary and the secondary clutch radius approaches 1:1, the secondary shaft speed will be approximately equal to the engine or crankshaft speed. As the primary pulley radius becomes greater than the radius of the secondary clutch, an overdrive condition exists in which the secondary shaft is turning at a greater rate than the engine crankshaft.

The primary clutch is connected to the power source and in theory has the job of maintaining the engine rpm at a value where the most power is being produced by the engine. The primary clutch may also control engagement and disengagement of the engine from the load in order to stop and start vehicle movement. In the case of a snowmobile, the secondary or driven clutch is connected to the load through a jackshaft, gears, chain and track, and functions to change the ratio of the two clutches as the load varies. This function is performed by a torque sensing helix or the like, that is typically considered part of the secondary clutch. An example of a secondary clutch having a torque sensing helix is disclosed in U.S. Pat. No. 5,516,333.

As the load to the secondary clutch fluctuates, the torque sensing helix will balance the power being received from the engine and the load by widening or narrowing the distance between the clutch sheaves. Altering the distance between the clutch sheaves changes an effective radius of the clutch around which the drive belt travels. The torque sensing helix is intended to automatically make widening and narrowing adjustments (upshifts and downshifts) almost instantaneously.

The torque sensing helix is essentially a cam slot formed in a clutch housing. The cam slot includes cam surfaces that engage associated cam followers that transfer the adjustments made by the torque sensing helix into variations of width between the clutch sheaves. The fixed sheave of the pulley is typically secured to the secondary shaft that transfers a load to and from the vehicle's track or wheels. The clutch housing including the torque sensing helix is secured to the movable sheave and retains a compression/torque spring against the fixed sheave. The compression/torque spring acts between an end of the housing and the fixed sheave, and is typically adjustable within the housing. The fixed sheave typically has cam followers secured to it that engage the cam surfaces of the torque sensing helix housing. As the torque sensing helix senses a change in load from the secondary shaft, the moveable sheave of the driven clutch will move to either compress or relax the compression spring causing the cam followers to move up or down the cam surfaces of the helix housing to increase or decrease the radius of the driven clutch.

A common problem associated with a driven clutch that utilizes a torque sensing helix with cam followers is backlash. Backlash occurs as the compression/torque spring moves from a relaxed to a compressed position and back to a relaxed position. The compression spring is commonly used to apply both torsion forces and compression forces to the cam followers that contact the cam surfaces. Torsional tension of the spring is applied to keep the cam followers in contact with the cam surfaces during changes in loading operations. In practice, however, the cam followers may actually leave the cam surface, usually when the load has momentarily significantly decreased. If the cam followers do leave the cam surface and the load is suddenly reintroduced, the cam followers recontact the cam surfaces with high, sometimes destructive forces. At the moment of recontact, the driven clutch may be set at an excessively high ratio so that the engine crankshaft speed immediately drops below the desired rpm range, causing a drop in power output from the system.

As mentioned, the compression/torsion spring must include a torsional component in order for the cam followers to maintain contact with the cam follower helical surface. An alternative to a single spring having both compression and torsion properties is to utilize separate springs in the housing, with one spring providing torsion forces and the other spring providing compression forces. However, even with the torsional component included in the housing, whether from one spring or two separate springs, backlash may still occur. Requiring a torsional component in the housing creates certain limitations to the design of the housing, the ability to adjust the spring(s), and the ability for the driven clutch to accommodate different belts having different widths, as well as a variety of other design considerations. A torque responsive clutch addressing disadvantages of known clutches and their components would be an important advance in the art.

SUMMARY OF THE INVENTION

The present invention relates to a belt-driven clutch system having a driven clutch with a particular arrangement of cam followers and cam slots. One embodiment of the invention is a clutch having a fixed sheave, a movable sheave and a housing mounted to the movable sheave. The housing has a cam slot with first and second cam surfaces. The clutch also includes a pair of cam followers that is secured to the fixed sheave for acting upon the cam surfaces of the housing. A first cam follower of the pair of cam followers acts upon a first cam surface of the cam slot and a second cam follower of the pair of cam followers acts upon the second cam surface of the cam slot. The clutch is configured to improve torque transfer efficiency and to reduce the backlash effect that is common in known driven clutches.

A further embodiment of the clutch includes multiple cam slots in the housing and multiple pairs of cam followers secured to the fixed sheave. A single pair of cam followers is arranged to engage first and second cam surfaces of a single cam slot. This embodiment is particularly applicable to a driven clutch for a variable speed belt drive transmission in a snowmobile, ATV or go kart.

The above summary of the present invention is not intended to describe each disclosed embodiment or every implementation of the present invention. The figures and the detailed description that follows more particularly exemplify these embodiments.

BRIEF DESCRIPTION OF THE PREFERRED EMBODIMENT

The invention may be more completely understood in consideration of the following detailed description of various embodiments of the invention in connection with the accompanying drawings, wherein like numerals represent like parts throughout several views, in which.

While the invention is amenable to various modifications in alternative forms, the specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to clutches, for example, driven clutches for a variable speed belt drive transmission. In particular, the present invention is directed to a driven clutch with a pair of cam followers that engage cam surfaces of a cam slot in a clutch housing. One cam follower acts upon a first cam surface in the cam slot and a second cam follower acts upon a second cam surface of the same cam slot. While the present invention may not be so limited, an appreciation of various aspects of the invention will be gained through a discussion of the examples provided below.

The clutch of the present invention overcomes many of the shortcomings of the prior art by reducing backlash in the system and improving the clutch's ability to transfer power and torque. The present invention accomplishes these objectives by ensuring contact between the cam followers, which are attached to a fixed sheave of the clutch, and cam surfaces of the cam slot in the clutch housing. "Contact" within the context of practical applications of the present invention may include actual contact or a design that is intended to provide actual contact within normal manufacturing tolerances. In some embodiments of the present invention where there are multiple cam slots and multiple pairs of cam followers, one or more of the cam followers may not be in contact with a cam surface at all times due to imperfections in manufacturing of the cam followers, cam slot and other features of the present invention.

A "cam follower" as used herein may include, for example, a roller, a pad, a shaped block, a curved pin, or a like feature that is capable of engaging and moving relative to a cam surface.

Figure 1:
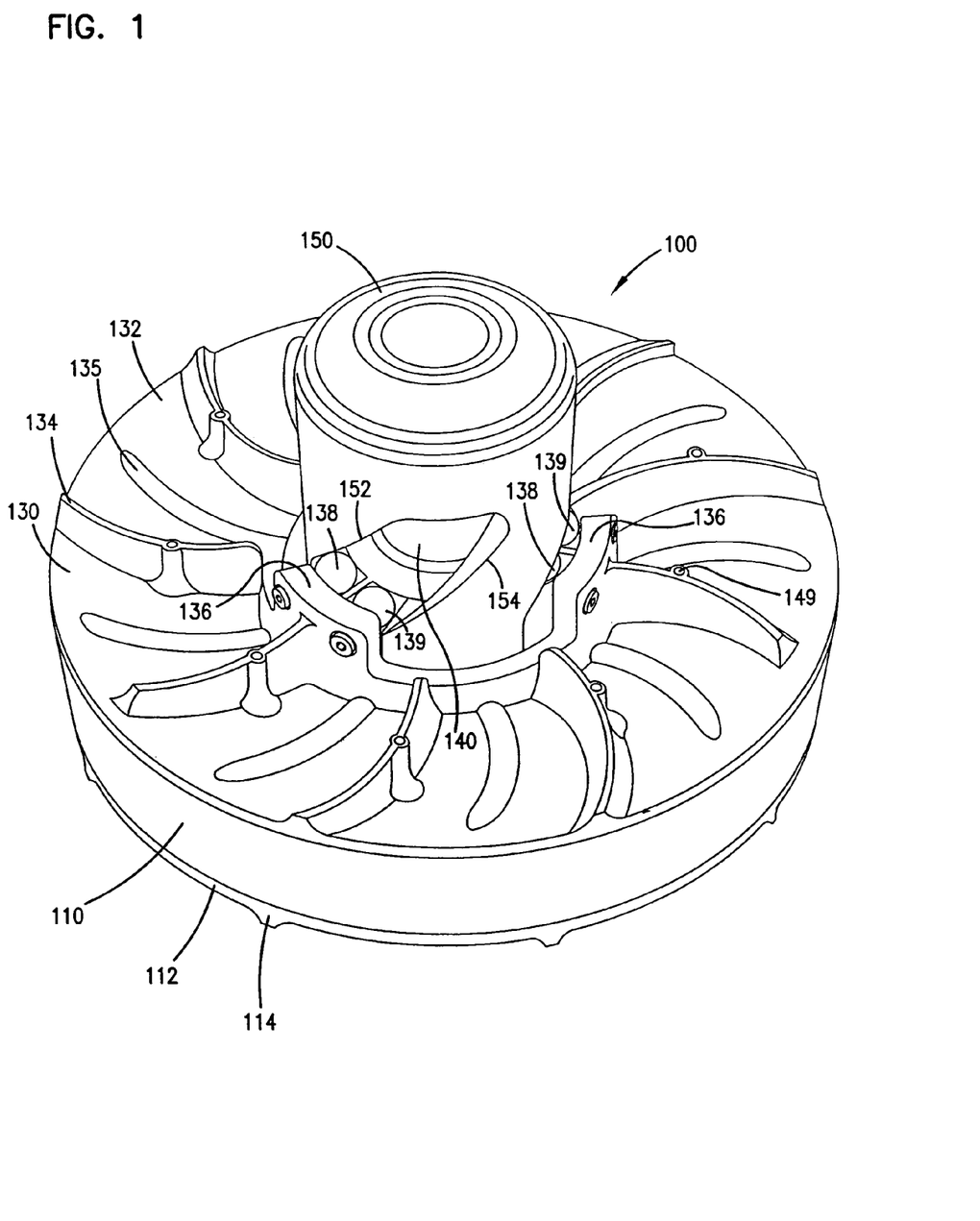
FIG. 1 is a perspective view of a clutch assembly, according to the invention.
Figure 2A:
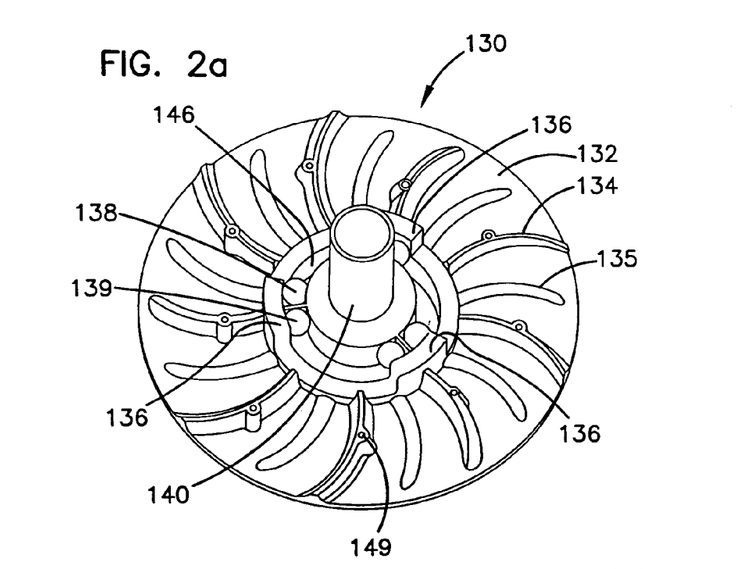
FIGS. 2a, 2b and 2c represent a perspective view of the clutch assembly of FIG. 1 in a disassembled arrangement.
Figure 2B:
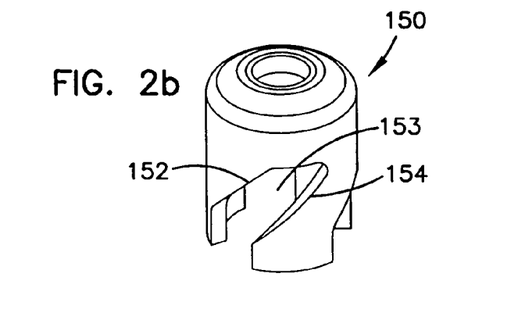
Figure 2C:
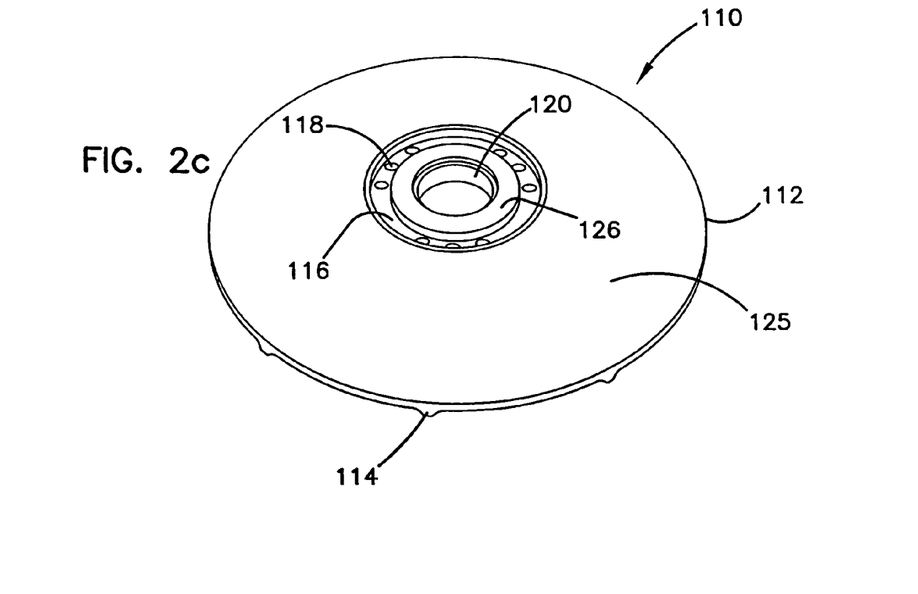

One example of a clutch 100 of the present invention includes a movable sheave 110, a fixed sheave 130, and a housing 150, as shown assembled in FIG. 1 and disassembled in FIGS. 2a–c. The movable sheave 110 includes a base plate 112, vanes 114 (shown in part), attachment bores 118, and belt surface 125. Fixed sheave 130 includes base plate 132, vanes 134 and 135, lugs 136, cam followers 138 and 139, shaft attachment 140, and housing recesses 146. Housing 150 includes cam slots 153 having cam surfaces 152 and 154, and may also include an adjustment mechanism (not shown—see FIGS. 9–11 for exemplary adjustment mechanisms) for adjusting a belt width of the clutch.

Figure 3:
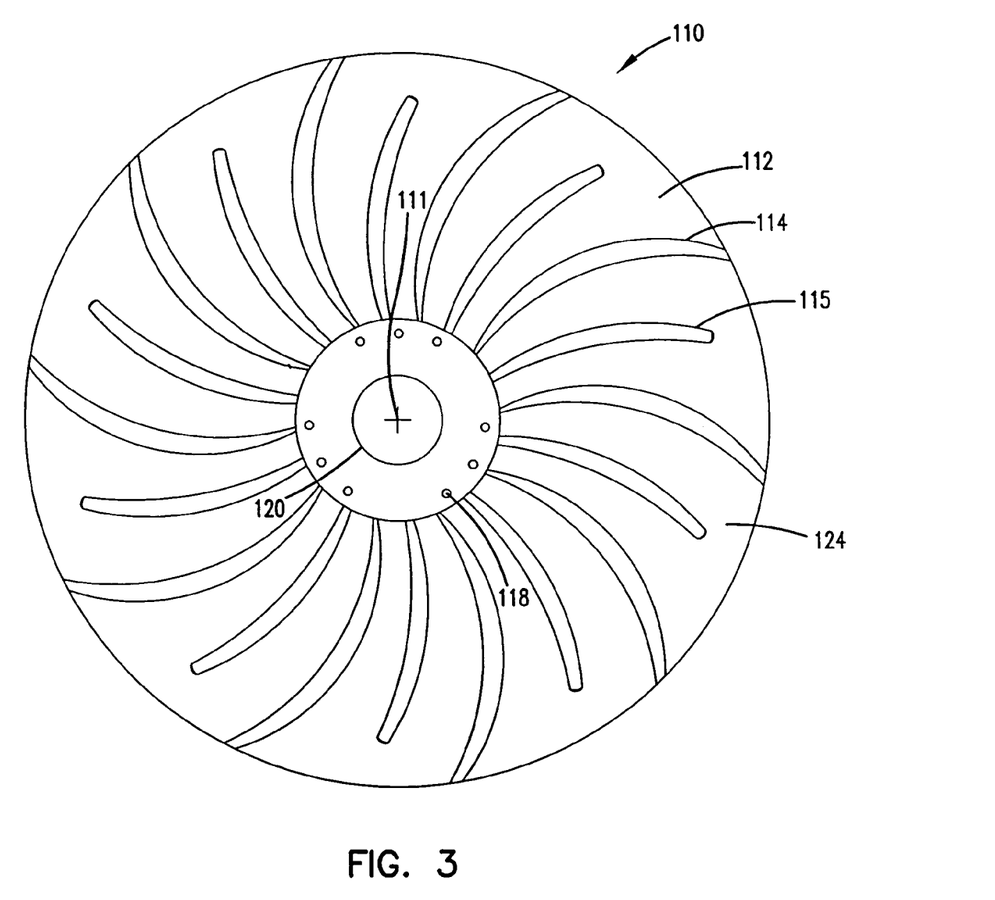
FIG. 3 is a front view of the movable sheave of FIG. 1.
Figure 4:
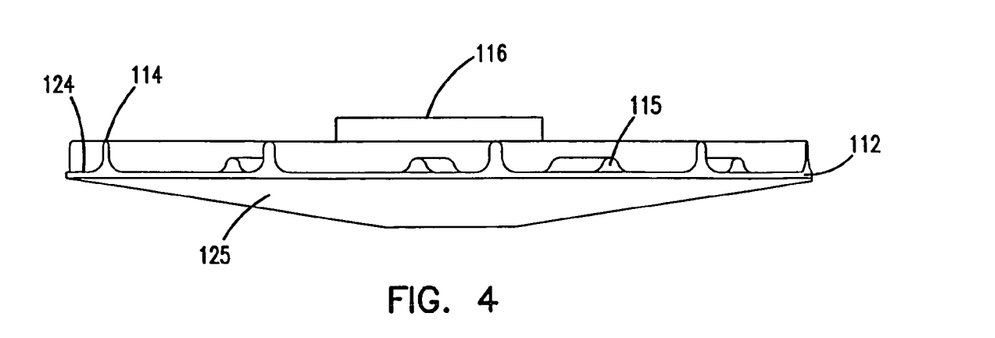
FIG. 4 is a side view of the movable sheave of FIG. 1.

FIG. 3 is a front view of the movable sheave 110 illustrated in FIGS. 1 and 2. Movable sheave 110 includes a base plate 112 having an axis 111, vanes 114 and 115, attachment surface 116, fastener bores 118, and throughbore 120 that is sized to receive a shaft. As further viewed in the side view of FIG. 4, base plate 112 includes vane surface 124 and belt surface 125. Belt surface 125 is configured to interface with a shaped belt such as a v-belt, where belt surface 125 must be angled with respect to axis 111 to properly engage the shaped belt. Vane surface 124 may be flat, extending substantially perpendicular to axis 111, or it may be angled relative to axis 111 so that it is substantially parallel to belt surface 125. In other embodiments, vane surface 124 may be curved relative to a plane perpendicular to axis 111. Alternative vane surface designs may improve performance of the sheave, by, for example reducing the weight of the sheave or enhancing heat transfer from the sheave.

The design and number of vanes 114 and 115 may vary to improve heat transfer while providing structure to the sheave. For example, when sheave 110 has a small thickness between vane surface 124 and belt surface 125, the vanes may strengthen the sheave against deformation or failure. In the embodiment illustrated in FIGS. 1–4, vanes 114 and 115 are equally spaced apart and radially extend at different lengths from axis 111. In other embodiments, vanes 114 and 115 may be identical in size and shape, and may be irregularly spaced apart. Vanes 114 and 115 are typically the same shape and size and are equal in number to the vanes members on fixed sheave 130, but may, in other embodiments be different from the vanes of fixed sheave 130. In yet other embodiments, the fixed and movable sheaves of clutch 100 may be designed without vanes.

Movable sheave 110 includes fastener bores 118 and mounting surface 116 for securing housing 150 to the movable sheave. Mounting surface 116 is configured to engage an attachment end surface of housing 150. When assembling clutch 100, threaded fasteners are inserted through fastener bores 118 and engage threaded bores formed in the attachment end of housing 150. Movable sheave 110 is configured to face and move relative to fixed sheave 130.

Figure 5:
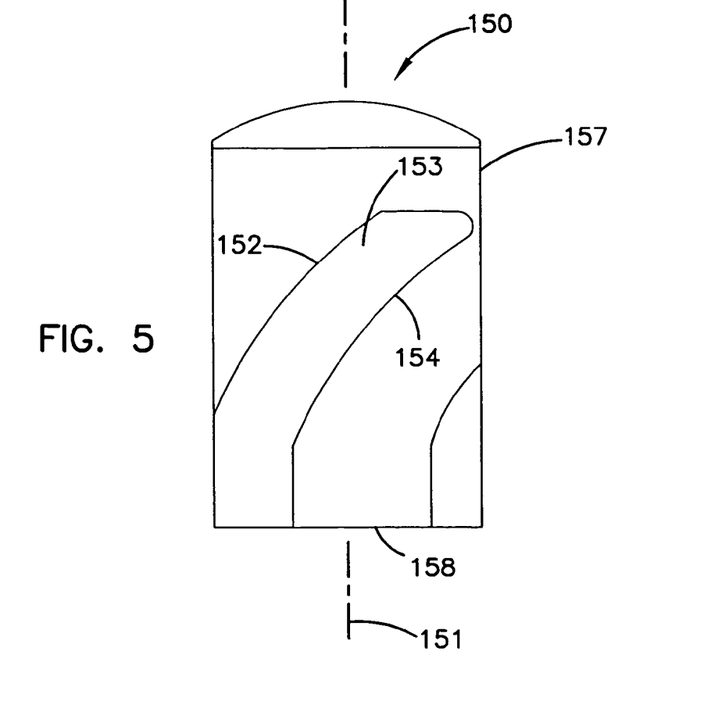
FIG. 5 is a side view of the housing of FIG. 1.
Figure 6:
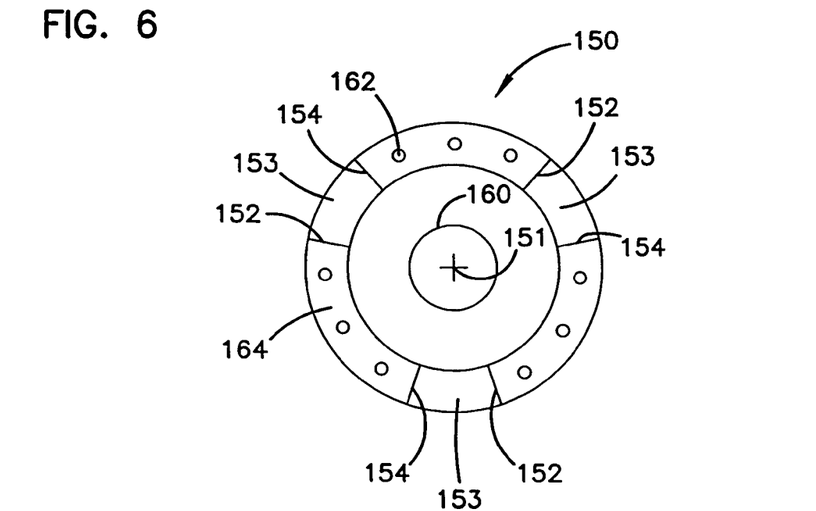
FIG. 6 is a bottom view of the housing of FIG. 1.

One embodiment of housing 150 is shown in FIGS. 5 and 6. FIG. 5 illustrates a side view of housing 150 having cam slots 153 with cam surfaces 152 and 154, and may further include an adjustment mechanism for adjusting a belt width of the clutch (not shown—See FIGS. 9–11 for exemplary adjustment mechanisms). Cam surfaces 152 and 154 generally oppose each other and are configured to receive cam followers 138 and 139. In this embodiment, cam followers 138 and 139 are rollers and may provide a low friction interface between the cam surfaces and the rollers. Cam slot 153 may be substantially helical in shape. "Helical" is defined in this context as a linear shape applied to a cylindrical body. "Substantially helical" may include a linear or slightly curved shape being applied to a cylindrical or slightly conically shaped body. In other embodiments, cam slot 153 is not linear and may have multiple angles along a length of the slot relative to an axis 151 of the housing. In all embodiments, cam surfaces 152 and 154 are preferred to be parallel and equally spaced apart along the length of cam slot 153.

Housing 150 may be generally cylindrical in shape with first and second ends. "Cylindrical" is broadly defined in this context as a body having parallel sides or having slightly conically-shaped sides, such that the circumference of the cylinder is greater at one end that at an opposing end. "Cylindrical" may also encompass a body having a variable circumference between opposing ends, for example, if the circumference was comparable at each end of the body and smaller or larger near a midpoint of the body.

Housing 150 may include an adjustment mechanism at the adjustment end (second housing end) 157 and threaded bores 162 formed in an attachment end (first housing end) 158. An attachment mechanism may rotatably engage housing adjustment end 157 for adjusting the tension of a spring that is housed within housing 150. Such a spring would function within housing 150 to create a compressive force between housing 150 and fixed sheave 130. An adjustment mechanism associated with housing 150 may include a fastener, nut, or some other adjustment feature that engages housing 150 to adjust the spring tension without having to disassemble the clutch. In addition to adjusting the tension of a spring in housing 150, access to the housing interior may be required to permit adjustment of fixed sheave 130 relative to a shaft to which clutch 100 is secured via a shaft attachment 140, or relative to movable sheave 110.

FIG. 6 illustrates a bottom view of housing 150 including axis 151, threaded bores 162, attachment surface 164, bore 160, and cam slots 153 with cam surfaces 152 and 154. Attachment surface 164 engages surface 116 of the movable sheave, and is configured to receive fasteners that extend through fastener bores 118 into threaded bores 162, thereby securing the housing to the fixed sheave.

FIGS. 1, 2, 7 and 8 illustrate fixed sheave 130 having an axis 131, a base plate 132, vanes 134 and 135, lugs 136, cam followers 138 and 139, and shaft attachment 140. Base plate 132 includes vane surface 144 and belt surface 145. Belt surface 145, like belt surface 125 of movable sheave 110, is configured to receive a shaped belt such as a v-belt, commonly used in a variable speed belt drive transmission. Sheave 130 further includes housing recesses 146 through which a portion of housing 150 may extend, and a support member 148.

Figure 7:
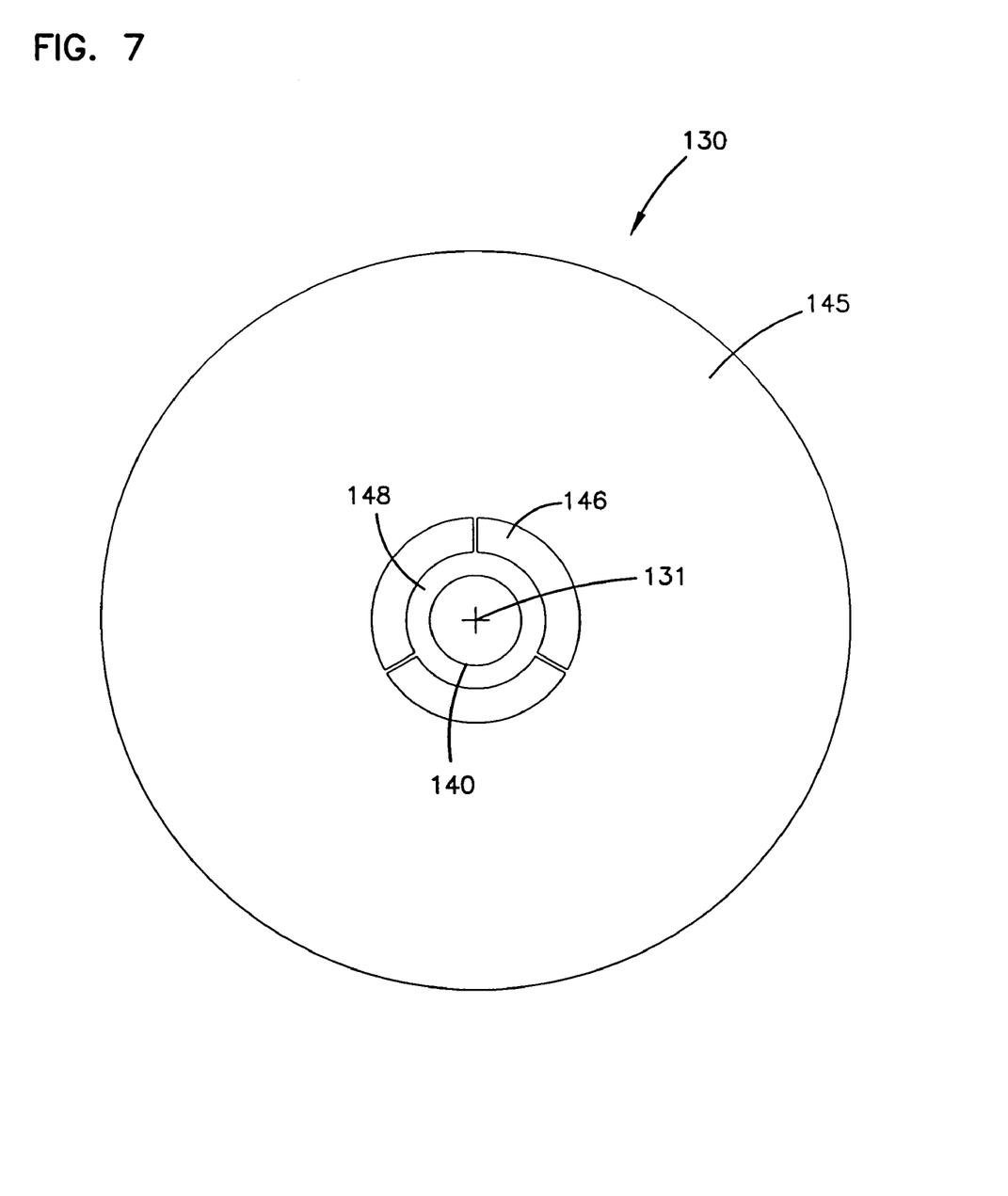
FIG. 7 is a rear view of the fixed sheave of FIG. 1.
Figure 8:
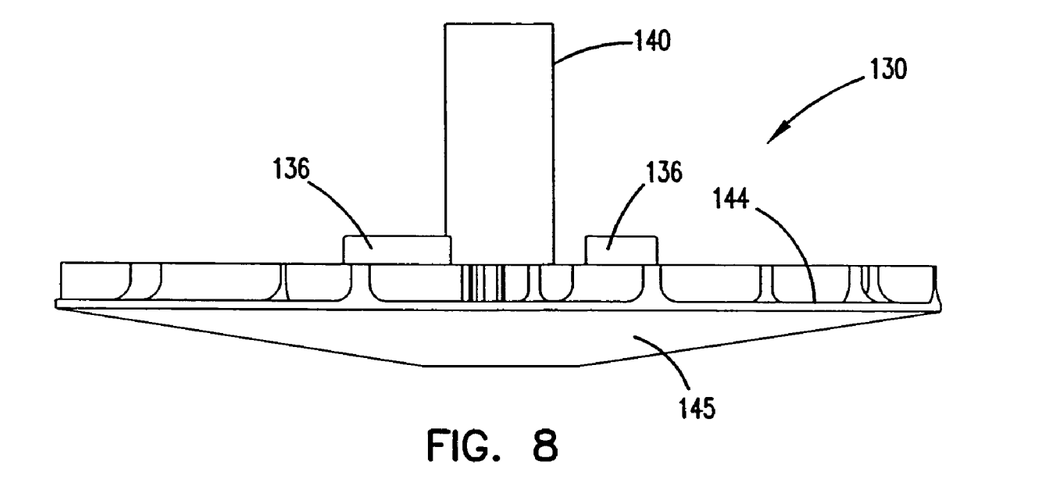
FIG. 8 is a side view of the fixed sheave of FIG. 1.

Vane surface 144 may be flat, extending substantially perpendicular to axis 131, or it may be angled relative to axis 131 so that it is substantially parallel to belt surface 145. In other embodiments, vane surface 144 may be curved relative to a plane perpendicular to axis 131. Alternative surface designs may improve performance of the sheave, by, for example reducing the weight of the sheave or enhancing heat transfer from the sheave.

The design and number of vanes 134 and 135 may vary to improve heat transfer while providing structure to the sheave. For example, when sheave 130 has a small thickness between vane surface 144 and belt surface 145, the vanes may strengthen the sheave against deformation or failure. In the embodiment illustrated in FIGS. 1, 2, 7 and 8, vanes 134 and 135 are equally spaced apart and radially extend at different lengths from axis 131. In other embodiments, vanes 134 and 135 may be identical in size and shape, and may be irregularly spaced apart.

Vanes 134 and 135 may be curved in the same direction as vanes 114 and 115 (as shown in this embodiment), or may be curved in opposite directions. Vanes curved in opposite directions would provide for vanes curved in the same rotational direction when the clutch is assembled. The vanes may other shapes, such as, for example, being straight rather than curved.

Lugs 136 may be equally spaced about axis 131 and extend axially from base plate 132. Cam followers 138 and 139 are mounted to lugs 136 such that the cam followers are then fixed to the movable sheave. Lugs 136 are integrally formed from fixed sheave 130 in this embodiment, but may, in alternative embodiments, be removable from the sheave and replaced with different lugs, for example, lugs that provide for different spacing between the cam followers or different positioning of the cam followers in cam slot 153 of housing 150. Lugs 136 may be attached to fixed sheave 130 with, for example, fasteners, adhesives, or other ways of securing parts together.

Cam followers 138 and 139 are sized to fit within recesses 146 in base plate 132. In this embodiment, cam followers 138 and 139 are rollers of a standard ¾ inch size. However, cam followers 138 and 139 may vary in size according to the application for which they are used and may be limited, for example, by the size of cam slot 153 in the housing. In a preferred embodiment, such as the snowmobile driven clutch illustrated in the several figures of this application, cam followers 138 and 139 are rollers with a ½ to 1 inch diameter.

When driven clutch 100 is assembled, as shown in FIG. 1, the invention provides several advantages. One advantage of the present invention is that cam followers 138 and 139 can maintain constant contact with their respective cam surfaces 152 and 154 during axial and rotational motion of the movable sheave relative to the fixed sheave. Cam followers 138 and 139 can maintain contact with their respective cam surfaces without torsional forces acting upon fixed sheave 130, that are typically required in known clutches in order to maintain contact between a cam follower and a cam surface.

Constant contact between cam followers 138 and 139 and cam surfaces 152 and 154 permits and facilitates efficient transfer of power and torque by the clutch. In addition, constant contact of fixed cam followers on both cam surfaces 152 and 154 significantly reduces the possibility of backlash occurring within the clutch. The backlash effect common in known clutches, typically occurs after a cam follower has been separated from contacting its respective cam surface. The negative aspect of backlash occurs when the cam follower is then brought back into contact with cam surface 152, causing a jump or spike in power transmission from the clutch to the drive transmission. Such a spike in power transmission from a driven clutch may cause the vehicle or system that is being driven by the transmission to suddenly increase or decrease in speed. Spikes in power transmission may also cause premature wear on the clutch system components.

The term "constant contact" as used herein is intended to take into consideration required manufacturing tolerances. In most instances, the cam followers do not literally contact the cam surfaces at all times, but are rather slightly spaced from the cam surface to account for a range of follower and cam slot tolerances. However, for purposes of the present invention, the spacing between the cam followers and cam surfaces is negligible as it relates to the backlash and other negative aspects of cam followers that are not in "constant contact" with cam surfaces.

Another advantage of the present invention is that a spring, commonly housed or captured within housing 150, which operates between housing 150 and fixed sheave 130, need not transfer a torque force from the housing to the fixed sheave. As discussed above, no torque force is required to maintain contact between the cam followers 138 and 139 and their respective cam surfaces 152 and 154. Consequently, a spring acting within housing 150 needs only to possess a compression force element that acts between fixed sheave 130 and housing 150. However, a torque force may still be generated by the spring if it is fixed at both ends (one end secured to the fixed sheave and another end secured to the housing) and is then wound as the housing rotates relative to the fixed sheave creating a negative or positive torque force.

A further advantage of the present invention is that the spring preload of the clutch may be adjusted without disassembling the clutch.

A further advantage of the present invention is that the invention is functional using several different numbers of pairs of cam followers. For example, FIGS. 1–8 illustrate a driven clutch 100 of the present invention that utilizes three sets of cam followers and three separate cam slots. Such a configuration is only a single representative embodiment of the invention. One, two, four, five or more sets of cam followers could be used with a corresponding number of cam slots 153 in housing 150 depending on the design constraints and intended purpose for the driven clutch. It is anticipated that a concentric and evenly spaced apart arrangement of sets of cam followers and cam slots would be advantageous for maintaining balance and efficiency within the clutch assembly. However, an unevenly spaced apart arrangement that might include even a single pair of cam followers may be found to be effective given modifications in other clutch assembly features, for example, the size and shape of housing 150 and the position of housing 150 relative to sheaves 110 and 130.

In a preferred embodiment, cam surfaces 152 and 154 are parallel and maintain a constant angle with respect to axis 151 of the housing. A preferred range of angles with respect to axis 151 is 30° to 66° and, more preferably, 38° to 52°. However, the angle of cam slot 153 may have more that one angle at various points along the cam surfaces 152 and 154 to provide specifically tailored shift patterns. The angle of cam slot 153 is also determined in part upon the amount of torque force that is required to be maintained between housing 150 and fixed sheave 130 in a given clutch system as the housing and movable sheave move both axially and radially relative to the fixed sheave.

Another aspect of the present invention is the threaded bores 149 on vanes 134 of fixed sheave 130. Threaded bores 149 may be included for the purpose of attaching windage shields (not shown) to the sheaves if necessary for alternative performance measures, such as reducing air movement caused by the clutch. Similar threaded bores may be included on vanes 135 and vanes 114 and 115 of movable sheave 110.

Figure 9:
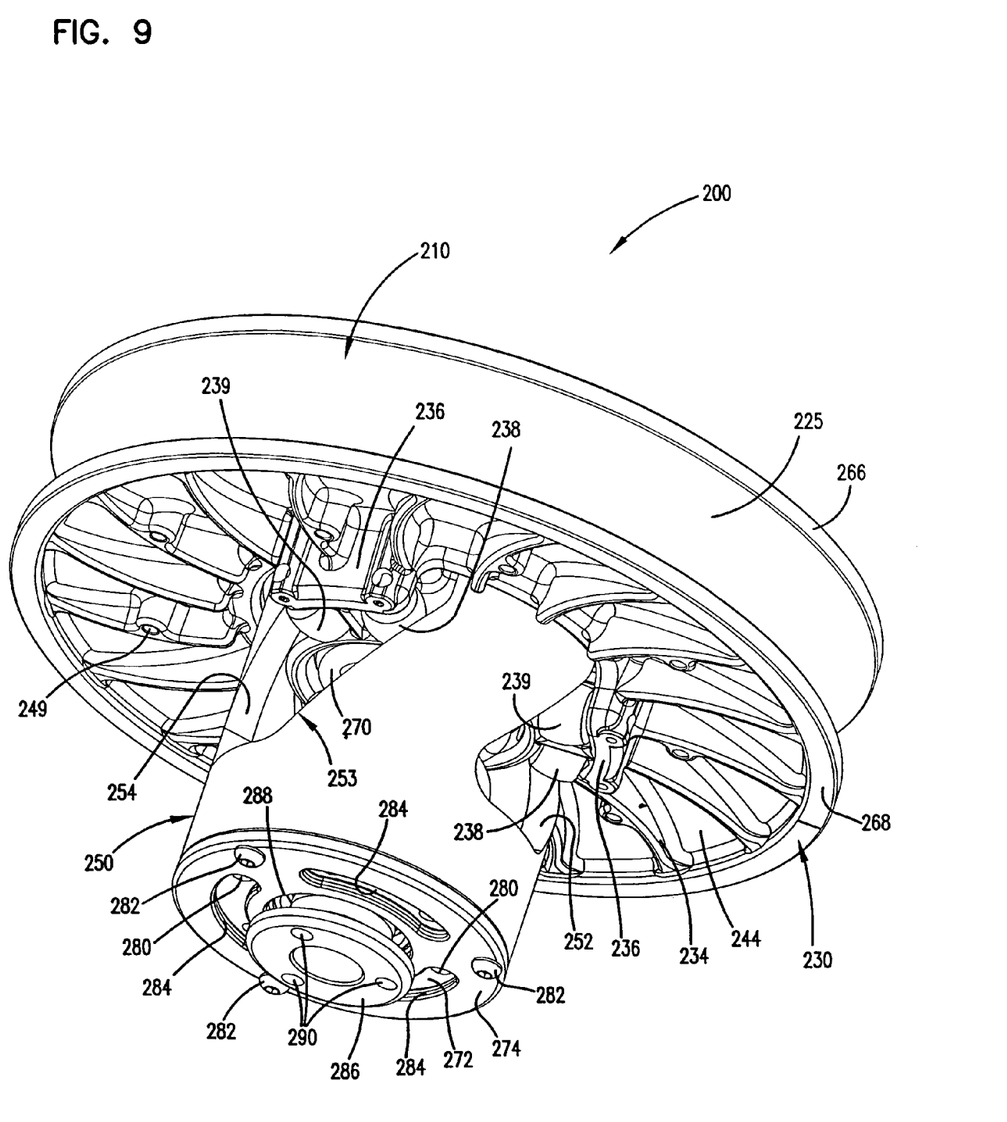
FIG. 9 is a perspective view of an alternative embodiment of a clutch assembly, according to the invention.
Figure 10:
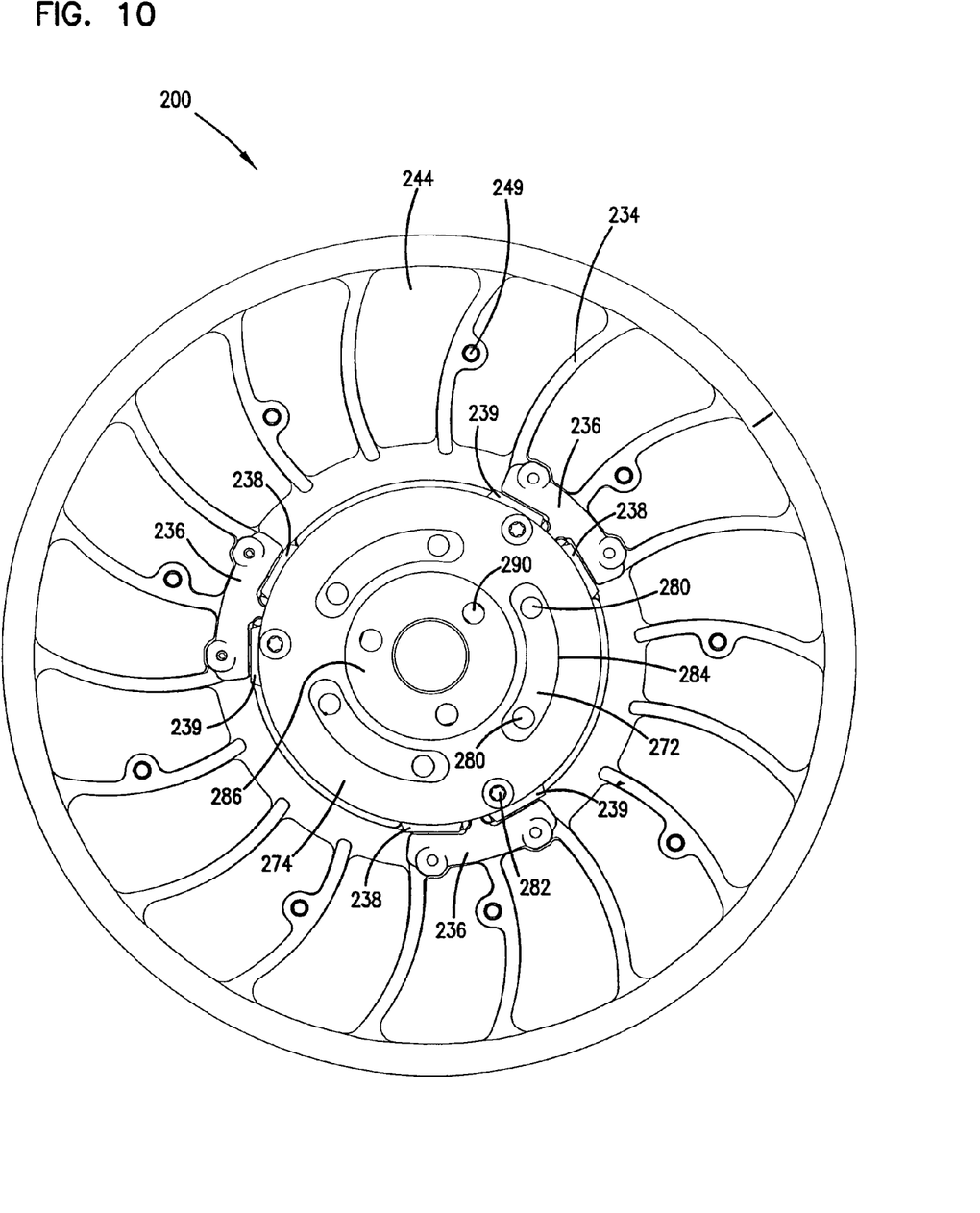
FIG. 10 is a front view of the clutch assembly of FIG. 9.
Figure 11:
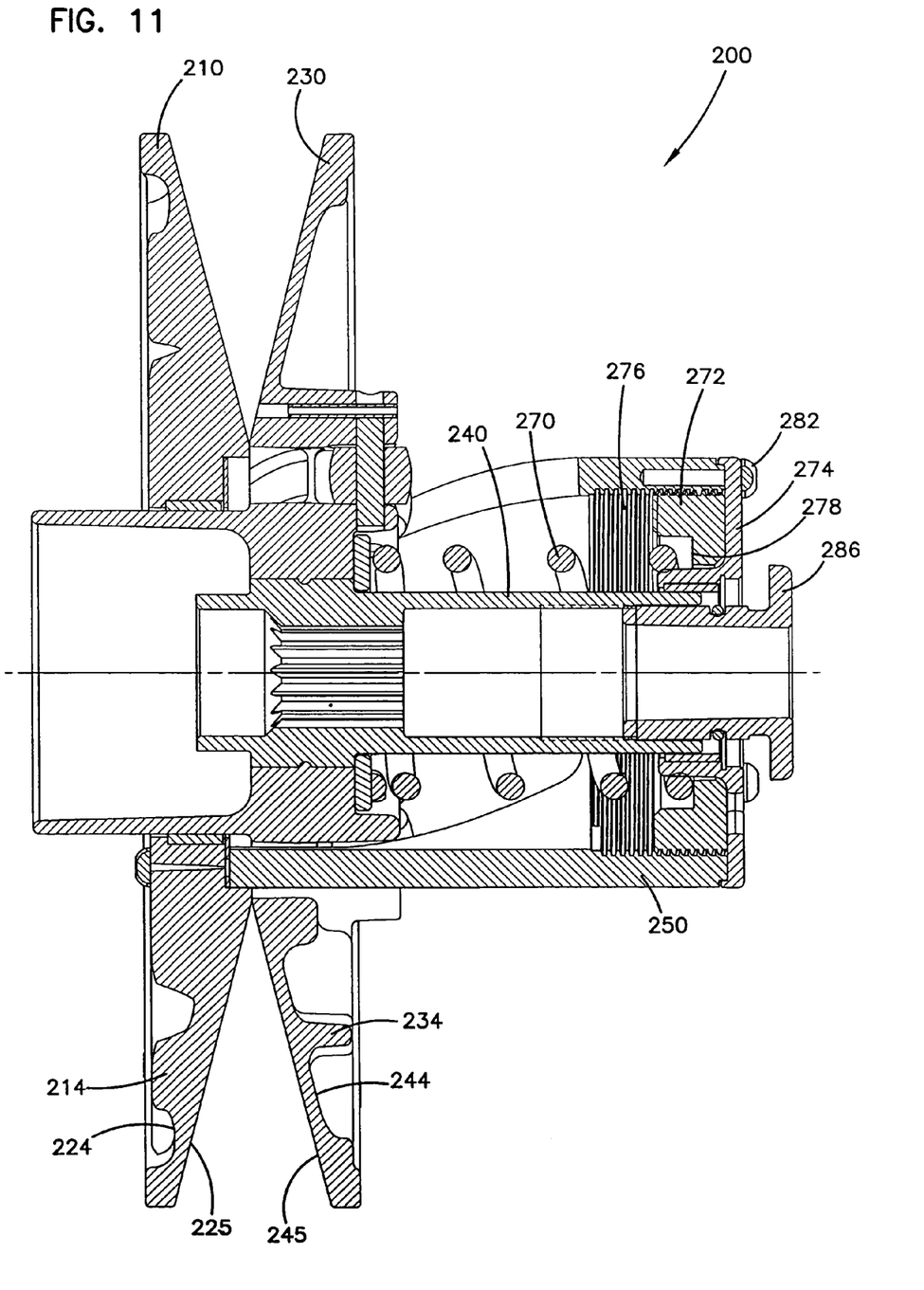
FIG. 11 is a cross-sectional view of the clutch assembly of FIG. 9.

FIGS. 9–11 illustrate an alternative clutch assembly 200, having a movable sheave 210, a fixed sheave 230, and a housing assembly. The housing assembly includes a housing 250 and adjustment features capable of adjusting the tension of a spring 270 retained in the housing (spring tension adjustment) and a spacing between the fixed and movable sheaves (belt width adjustment).

Movable sheave 210 includes vanes 214 formed on a vane surface 224, a belt surface 225, and apertures configured to receive a portion of fixed sheave 230. Fixed sheave 230 includes vanes 234 formed on a vane surface 244, a belt surface 245, and apertures configured to receive a portion of housing 250. Vanes 214 and 234 may have a height, measured from the vane surface in an axial direction, which varies from an outer circumference towards an axis of the sheave. The variable height of the vanes may be determined by the angle of the belt surface when the sheave has a constant thickness between the vane surface and the belt surface, as shown in FIG. 11.

The movable and fixed sheaves may also include rings 266 and 268 positioned around an outer circumference of the sheaves. The rings may be useful for balancing the sheaves and providing additional structural support for the sheaves at their outer edge.

Housing 250 includes cam slots 253 formed in an exterior surface of the housing that define cam surfaces 252 and 254. Cam surfaces 252 and 254 generally oppose each other and are configured to engage cam followers 238 and 239. Cam followers 238 and 239 are rollers in this embodiment, but may be differently shaped with different sizes in other embodiments. Cam followers 238 and 239 are mounted to lugs 236 that extend radially from fixed sheave 230, as shown in FIG. 9. Housing 250 includes three equally spaced cam slots in this embodiment that match with three sets of cam followers, but may, in other embodiments, include fewer or more cam slots with equal sets of cam followers.

Housing 250 may include a spring tension adjuster 272 and an end cap 274. Adjuster 272 may be collar or ring-shaped having external threads that engage internal threads 276 formed in housing 250, and a recessed portion or seat 278 that engages an end of spring 270 (See FIG. 11). An opposite end of spring 270 engages a seat portion of fixed sheave 230 so that rotation of adjuster 272 within housing 250 adjusts the tension of the spring. Adjuster 272 may also include engagement features 280 that assist in rotating adjuster 272 within housing 250. Engagement features 280 may be, for example, bores symmetrically spaced apart on a surface of adjuster 272 that are accessible from an end of housing 250.

End cap 274 may be secured to an end of housing 250 to cover a portion of the housing and ensure that adjuster 272 is not inadvertently removed from the housing. End cap 274 may be removably held in position on the housing by fasteners 282. End cap 274 may also include slots 284 aligned with engagement features 280 to facilitate rotational adjustment of adjuster 272. There may be one or more slots 284, or, in other embodiments, no slots such that end cap 274 must be removed to allow adjustments to adjuster 272.

In other embodiments, adjuster 272 may be configured differently, while maintaining the ability to adjust the tension of spring 270. For example, adjuster 272 may include a protrusion that engages a track formed on the interior surface of housing 250, and an adjustment feature extending from end cap 274 axially moves adjuster 272 relative to the housing along the track.

Clutch 200 may also include a belt width adjuster 286 that engages shaft attachment 240 of the fixed sheave and a shaft (not shown) extending into the shaft attachment. Adjuster 286 passes through an aperture 288 in end cap 274 to engage the shaft attachment, and may include external threads that engage threads formed on an internal surface of the shaft attachment. Thus, rotation of adjuster 286 within the shaft attachment may move, or permit movement of, the fixed sheave relative to the shaft. Movement of the fixed sheave relative to the shaft may adjust the distance or spacing between the fixed and movable sheave.

In other embodiments, adjuster 286 may be configured differently, while providing adjustment of the distance between the fixed and moveable sheaves. For example, adjuster 286 may be secured to shaft attachment 240 at a given axial position but remain rotatable relative to the fixed sheave. Further, the external threads of adjuster 286 may engage threads formed on an internal surface of aperture 288 in end cap 274. Therefore, as a result of rotating adjuster 286, the distance or spacing between the fixed and movable sheave may be adjusted.

Adjuster 286 may also include engagement features 290 similar to features 280 that facilitate adjustment of the belt width. These engagement features 290 may be rounded bores symmetrically spaced around a shaft attachment surface, as shown in FIGS. 9 and 10.

A benefit to the adjustment features of clutch 200 is that the spring tension and the belt width can be adjusted essentially independent of each other. A further benefit of clutch 200 is that the spring tension and the belt width may be adjusted without disassembling or removing the clutch.

Although a specific example of a driven clutch for a variable speed belt drive transmission for a snowmobile has been described above, it will be understood that this embodiment may be placed and utilized within numerous variable speed belt drive transmissions. For example, the driven clutch features may be integrated into a drive clutch and may further be included in an ATV, go-kart or other vehicle besides a snowmobile.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A clutch comprising:
    a fixed sheave;
    a movable sheave;
    a housing mounted to the movable sheave, the housing having a cam slot with first and second opposing surfaces;
    a pair of cam followers secured to the fixed sheave;
    wherein a first cam follower of the pair of cam followers contacts the first cam surface and a second cam follower of the pair of cam followers contacts the second cam surface, the first and second cam followers maintaining contact with respective first and second cam surfaces as the cam followers move in the cam slot the first cam follower being substantially closer than the second cam follower to the first cam surface, and the second cam follower being substantially closer than the first cam follower to the second cam surface.

2. The clutch of claim 1 wherein the clutch comprises at least two pair of cam followers and the housing comprises at least two cam slots, each of the cam slots being provided with a pair of cam followers.

3. The clutch of claim 2 wherein the cam slots are equally spaced around a circumference of the housing.

4. The clutch of claim 1 wherein the clutch comprises three pairs of cam followers and the housing comprises three cam slots, and wherein a first pair of cam followers acts upon a first cam slot, a second pair of cam followers different from the first pair of cam followers acts upon a second cam slot, and a third pair of cam followers different from the first and second pair of cam followers acts upon a third cam slot.

5. The clutch of claim 1 further comprising a compression spring acting within the housing between the housing and the fixed sheave.

6. The clutch of claim 1 wherein the cam slot is substantially helical shaped.

7. The clutch of claim 1 wherein the cam slot is linear and angled with respect to an axis that extends axially through the clutch.

8. The clutch of claim 1 wherein the cam slot is nonlinear having multiple angles along a length of the slot, with respect to an axis that extends axially through the clutch.

9. The clutch of claim 1 wherein the housing has a first end and a second end, the second housing end being secured to the movable sheave, and a spring tension adjustment mechanism being secured to the first housing end, the spring tension adjustment mechanism adjusting the tension of a spring positioned within the housing.

10. The clutch of claim 9 wherein tension of the spring mounted in the housing is adjusted by the spring tension adjustment mechanism without disassembling the clutch.

11. The clutch of claim 1 further comprising a shaft attachment secured to the fixed sheave, the shaft attachment having internal attachment features that mate with external attachment features of a shaft, the shaft attachment removably securing the fixed sheave to the shaft.

12. The clutch of claim 1, wherein the fixed sheave comprises lugs for mounting the cam followers, wherein the lugs extend axially away from the fixed sheave.

13. The clutch of claim 1 wherein the movable sheave and the fixed sheave have a belt surface and an opposing vane surface, and vanes extend from the vane surface.

14. The clutch of claim 1 wherein the housing is generally cylindrically shaped with an first end and a second end, wherein the first end is secured to the movable sheave and the second end is configured to receive a spring tension adjustment mechanism.

15. The clutch of claim 1, wherein the cam slot is a closed slot having closed ends.

16. The clutch of claim 1, wherein the housing includes first and second ends, the first end being secured to the movable sheave and the fixed sheave being positioned between the movable sheave and the second end of the housing.

17. A clutch comprising
    a fixed sheave;
    a movable sheave;
    a housing mounted to the movable sheave, the housing having a cam slot with first and second opposing surfaces;
    a pair of cam followers secured to the fixed sheave;
    wherein a first cam follower of the pair of cam followers contacts the first cam surface and a second cam follower of the pair of cam followers contacts the second cam surface, the first and second cam followers maintaining contact with respective first and second cam surfaces as the cam followers move in the cam slot;

a shaft attachment secured to the fixed sheave, the shaft attachment having internal attachment features that mate with external attachment features of a shaft, the shaft attachment removably securing the fixed sheave to the shaft; and a belt width adjustment mechanism comprising threads formed on an exterior surface of the mechanism, the threads rotatably engaging threads formed on an inner surface of the shaft attachment, whereby rotation of the belt width adjustment mechanism in the shaft attachment adjusts a position of the fixed sheave relative to the shaft.

18. The clutch of claim 17 wherein a distance between the movable sheave and the fixed sheave is adjusted by adjusting the belt width adjustment mechanism, and the distance between the movable sheave and the fixed sheave is adjusted without disassembling the clutch.

19. A clutch comprising:
a fixed sheave;
a movable sheave;
a housing mounted to the movable sheave, the housing having a cam slot with first and second opposing surfaces, the housing comprising first and second ends, the housing first end engaging the movable sheave, the clutch further comprising an end cap secured to the housing second end, the end cap having first and second apertures, the first aperture providing access to a spring tension adjustment mechanism, and the second aperture receiving a belt width adjustment; and
a pair of cam followers secured to the fixed sheave;
wherein a first cam follower of the pair of cam followers contacts the first cam surface and a second cam follower of the pair of cam followers contacts the second cam surface, the first and second cam followers maintaining contact with respective first and second cam surfaces as the cam followers move in the cam slot.

20. A clutch comprising:
a fixed sheave;
a movable sheave;
a housing mounted to the movable sheave, the housing having first and second ends and a cam slot with first and second opposing surfaces, the housing first end extending through the fixed sheave and being secured to the movable sheave, the fixed sheave being interposed between the movable sheave a the second end of the housing; and
a pair of cam followers secured to the fixed sheave;
wherein a first cam follower of the pair of cam followers engage the first cam surface and a second cam follower of the pair of cam followers engage the second cam surface the first cam follower being located between the first cam surface and the second cam follower and the second cam follower being located between the second cam surface and the second cam follower.

21. The system of claim 20, wherein the first and second cam followers maintain substantial engagement with respective first and second cam surfaces during movement of the cam followers within the cam slot.

22. A clutch comprising:
a fixed sheave;
a movable sheave;
a housing having first and second ends, the second housing end being mounted to the movable sheave, the housing having a cam slot with first and second opposing surfaces;
a pair of cam followers secured to the fixed sheave; and
a spring tension adjustment mechanism being secured to the first housing end, the spring tension adjustment mechanism adjusting the tension of a spring positioned within the housing;
wherein a first cam follower of the pair of cam followers acts upon the first cam surface and a second cam follower of the pair of cam followers acts upon the second cam surface, the first cam follower being substantially closer than the second cam follower to the first cam surface, and the second cam follower being substantially closer than the first cam follower to the second cam surface.

23. The clutch of claim 22 wherein tension of the spring mounted in the housing is adjusted by the spring tension adjustment mechanism without disassembling the clutch.

24. A clutch comprising:
a fixed sheave;
a movable sheave;
a housing mounted to the movable sheave, the housing having a cam slot with first and second opposing surfaces;
a pair of cam followers secured to the fixed sheave; and
a shaft attachment secured to the fixed sheave, the shaft attachment having internal attachment features that mate with external attachment features of a shaft, the shaft attachment removably securing the fixed sheave to the shaft;
wherein a first cam follower of the pair of cam followers acts upon the first cam surface and a second cam follower of the pair of cam followers acts upon the second cam surface the first cam follower being substantially closer than the second cam follower to the first cam surface, and the second cam follower being substantially closer than the first cam follower to the second cam surface.

* * * * *